(12) United States Patent
Paihonen et al.

(10) Patent No.: US 9,176,612 B2
(45) Date of Patent: Nov. 3, 2015

(54) MASTER APPLICATION FOR TOUCH SCREEN APPARATUS

(71) Applicant: Ixonos Oyj, Helsinki (FI)

(72) Inventors: Sami Paihonen, Saratoga, CA (US); Esa Nettamo, Helsinki (FI); Korhan Buyukdemirci, Helsinki (FI); Jani Järvinen, Sundsberg (FI); Jarkko Lunnas, Espoo (FI); Chris Rawlings, Helsinki (FI); Marco Zamarato, San Francisco, CA (US)

(73) Assignee: Ixonos Oyj, Helsinki (FI)

( * ) Notice: Subject to any disclaimer, the term of this patent is extended or adjusted under 35 U.S.C. 154(b) by 87 days.

(21) Appl. No.: 13/721,459

(22) Filed: Dec. 20, 2012

(65) Prior Publication Data

US 2013/0187874 A1 Jul. 25, 2013

(30) Foreign Application Priority Data

Dec. 21, 2011 (FI) ...................................... 20116295

(51) Int. Cl.
*G06F 3/041* (2006.01)
*G06F 3/0488* (2013.01)

(52) U.S. Cl.
CPC .............. *G06F 3/041* (2013.01); *G06F 3/0488* (2013.01)

(58) Field of Classification Search
CPC ................. G06F 3/041; G06F 3/0488; G06F 2203/04803; G06F 3/0481; G06F 3/04886; G06F 2203/04808; G06F 3/0483; G06F 3/04845
USPC ..................... 345/156–175; 178/18.01–18.06; 455/566; 715/784, 788, 800, 863
See application file for complete search history.

(56) References Cited

U.S. PATENT DOCUMENTS

| 5,487,143 | A | 1/1996 | Southgate |
| 6,008,809 | A | 12/1999 | Brooks |
| 6,832,355 | B1 | 12/2004 | Duperrouzel et al. |
| 7,480,872 | B1 | 1/2009 | Ubillos |
| 8,208,964 | B2 | 6/2012 | Dobroth et al. |
| 8,730,269 | B2 * | 5/2014 | Pinto et al. .................... 345/684 |
| 8,731,458 | B2 * | 5/2014 | Sullivan ...................... 455/3.03 |
| 2005/0166158 | A1 * | 7/2005 | Blanchard et al. ............ 715/768 |
| 2008/0066111 | A1 * | 3/2008 | Ellis et al. ....................... 725/57 |
| 2008/0168401 | A1 * | 7/2008 | Boule et al. ................... 715/863 |
| 2009/0064035 | A1 | 3/2009 | Shibata et al. |

(Continued)

FOREIGN PATENT DOCUMENTS

EP 2138929 A2 12/2009

*Primary Examiner* — Alexander Eisen
*Assistant Examiner* — Abhishek Sarma
(74) *Attorney, Agent, or Firm* — Ziegler IP Law Group LLC

(57) ABSTRACT

An apparatus includes a touch sensitive display for displaying a master application frame; a detector configured to detect a touch point of a user on display; at least one processor; and at least one memory including computer program code. The apparatus is configured to display the master application frame including a plurality of slave application frames; determine at least two slave application frames based on a first touch point; define a sweep function configured to detect a sweep gesture on the touch sensitive display between the first and a second touch point, and adjust sizes of the determined slave application frames, in a non-overlapped manner, based on the detected sweep gesture. Furthermore, the apparatus is configured to detect a third touch point on a border line for at least two slave application frames; and trigger an overlapping slave application frame in response to the detected third touch point.

20 Claims, 5 Drawing Sheets

(56) References Cited

U.S. PATENT DOCUMENTS

| | | |
|---|---|---|
| 2010/0088634 A1* | 4/2010 | Tsuruta et al. ............... 715/800 |
| 2010/0138767 A1 | 6/2010 | Wang |
| 2010/0313164 A1* | 12/2010 | Louch et al. ................ 715/790 |
| 2011/0105187 A1* | 5/2011 | Dobroth et al. .............. 455/566 |
| 2012/0030566 A1* | 2/2012 | Victor ........................... 715/702 |
| 2012/0054671 A1* | 3/2012 | Thompson et al. ........... 715/784 |
| 2012/0144331 A1* | 6/2012 | Tolonen et al. ............... 715/769 |
| 2013/0021281 A1* | 1/2013 | Tse et al. ...................... 345/173 |

\* cited by examiner

MASTER APPLICATION FOR TOUCH SCREEN APPARATUS

TECHNICAL FIELD

The present invention generally relates to apparatuses with touch screens. The invention relates particularly, though not exclusively, to providing a master application frame and plurality of slave application frames.

BACKGROUND ART

Touch-sensitive surfaces are widely used to provide a user with an enhanced pointing interface. Such surfaces may be used as touch-sensitive displays or touch-sensitive pads with normal displays, for example.

There is variety of technologies for the touch-sensitive surfaces, such as resistive, capacitive, acoustic, and infrared. The capacitive touch-sensitive surfaces are currently very popular and typically provide multiple applications and services.

The user operates a handheld portable apparatus with different applications. Typically non-overlapping application frames may be displayed one at a time in the handheld portable apparatuses. A solution is needed for displaying multiple application frames simultaneously and adjusting the sizes of the application frames user-friendly.

SUMMARY

According to a first example aspect of the invention there is provided an apparatus comprising: a touch sensitive display for displaying a master application frame; a detector configured to detect a touch point of a user on the touch sensitive display; at least one processor; and at least one memory including computer program code, the at least one memory and the computer program code being configured to, with the at least one processor, cause the apparatus at least to:
display the master application frame comprising plurality of slave application frames;
determine at least two slave application frames based on a first touch point;
define a sweep function configured to detect, using the detector, a sweep gesture on the touch sensitive display between the first and a second touch point;
adjust sizes of the determined at least two slave application frames, in a non-overlapped manner, based on the detected sweep gesture;
detect a third touch point on a border line for at least two slave application frames; and
trigger an overlapping slave application frame in response to the detected third touch point.

In an embodiment, the at least one memory and the computer program code being further configured to, with the at least one processor, cause the apparatus at least to:
define a sweep function configured to detect, using the detector, a sweep gesture on the touch sensitive display between the first and the second touch point; and
adjust sizes of the determined at least two slave application frames based on the detected sweep gesture.

In an embodiment, the at least one memory and the computer program code being further configured to, with the at least one processor, cause the apparatus at least to:
detect the first touch point at a border of the at least two slave application frames; and
adjust sizes of the determined at least two slave application frames by moving the border of the at least two slave application frames to the second touch point.

The border of the at least two slave application frames may comprise at least one of the following:
a frame line between at least two slave application frames; and
a border line for at least two slave application frames.

In an embodiment, the at least one memory and the computer program code being further configured to, with the at least one processor, cause the apparatus at least to:
display a master application frame comprising four slave application frames, wherein the four slave application frames sharing a common frame point;
determine the four slave application frames based on a first touch point, wherein the first touch point corresponds to the common frame point; and
adjust sizes of the determined four slave application frames, in a non-overlapped manner, based on a second touch point.

Each slave application frame may present information provided by a different slave application, selectable by the user.

In an embodiment, the overlapping slave application frame comprises at least one of the following:
real-time information; and
settings menu.

In an embodiment, at least one slave application frame comprises information relating to an electronic book.

In an embodiment, a first slave application frame comprises information relating to a first page of a first electronic book and a second slave application frame comprises information relating to a second page of a second electronic book. The first and second book may be same or different books.

In an embodiment, an outlook of the master application frame may be dynamically changeable by the user. Furthermore, at least one slave application frame may present information provided by a slave application to the user. The master application may also provide information relating to a live event, such as a sports event.

In an embodiment, the at least one memory and the computer program code being further configured to, with the at least one processor, cause the apparatus at least to:
provide real-time information of the sports event in a first slave application frame; and
provide non-real-time information of the sports event in a second slave application frame.

The slave application frame may present information provided by a slave application, the slave application providing at least one of the following:
a score service;
a video application;
an internet radio;
a ticket store;
a fan shop;
player cards;
statistics;
fixtures;
sponsor information; and
a social media application.

In an embodiment, the at least one memory and the computer program code being further configured to, with the at least one processor, cause the apparatus at least to:
determine at least one fixed slave application frame overlapping at least one other slave application frame.

In an embodiment, the at least one memory and the computer program code being further configured to, with the at least one processor, cause the apparatus at least to:

define a control item touch point in the master application frame overlapping the at least two slave application frames; and provide settings menu for selecting slave applications for the slave application frames in response to the user touching the control item touch point.

According to a second example aspect of the invention there is provided a method comprising:

displaying a master application frame comprising plurality of slave application frames, on a touch sensitive display;

detecting a touch point of a user on the touch sensitive display;

determining at least two slave application frames based on a first touch point;

defining a sweep function configured to detect, using the detector, a sweep gesture on the touch sensitive display between the first and a second touch point;

adjusting sizes of the determined at least two slave application frames, in a non-overlapped manner, based on the detected sweep gesture;

detecting a third touch point on a border line for at least two slave application frames; and triggering an overlapping slave application frame in response to the detected third touch point.

In an embodiment, the method further comprises:
a. defining a sweep function configured to detect, using the detector, a sweep gesture on the touch sensitive display between the first and the second touch point; and
b. adjusting sizes of the determined at least two slave application frames based on the detected sweep gesture.

According to a third example aspect of the invention there is provided a computer program embodied on a computer readable medium comprising computer executable program code which, when executed by at least one processor of an apparatus, causes the apparatus to:

display a master application frame comprising plurality of slave application frames, on a touch sensitive display;

detect a touch point of a user on the touch sensitive display;

determine at least two slave application frames based on a first touch point; define a sweep function configured to detect, using the detector, a sweep gesture on the touch sensitive display between the first and a second touch point;

adjust sizes of the determined at least two slave application frames, in a non-overlapped manner, based on the detected sweep gesture;

detect a third touch point on a border line for at least two slave application frames; and trigger an overlapping slave application frame in response to the detected third touch point.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1A:
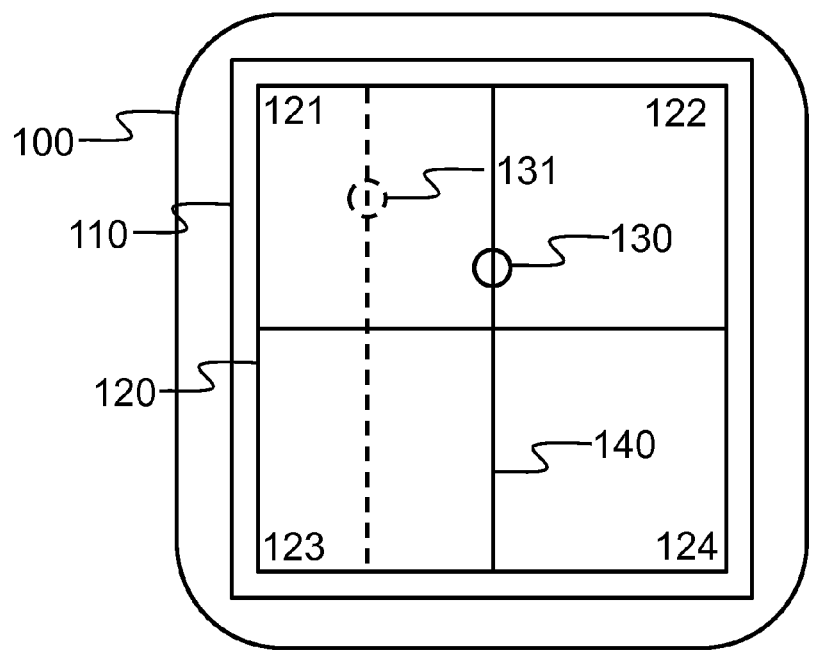
FIG. 1a shows a schematic picture of an apparatus according to an example embodiment of the invention.

FIG. 1a shows a schematic picture of an apparatus 100 according to an example embodiment of the invention. The apparatus 100 comprises a touch-sensitive surface, such as a touch sensitive display 110. The apparatus 100 may be held and operated in a vertical mode or a landscape mode. The touch sensitive display 110 is configured to display information to a user of the apparatus 100. Furthermore, the apparatus comprises a detector configured to detect a touch point of the user on the touch sensitive display 110. The touch sensitive display comprises a predetermined viewing area for a master application. A master application frame 120 is displayed, on the master application viewing area, which frame 120 may comprise a plurality of slave application frames 121-124.

In an embodiment, the user may touch the display 110 in a certain location. Such location is represented as a touch point 130. The touch point 130 may be determined using the detector of the apparatus 100. In case the touch point 130 is located over a frame line 140 between at least two slave application frames 121-124, as shown in FIG. 1a, the at least two slave application frames 121-124 may be determined based on the touch point 130. The user may provide a second touch point 131 on the touch sensitive display 110 in a similar fashion as described for the first touch point 130. The user may release his finger from the touch sensitive display 110 between the first and the second touch points 130-131 or the user may sweep his finger between the points 130-131, for example. Based on the second touch point 131, the frame line 140 is relocated and sizes of the at least two slave application frames 121-124 may be adjusted, in a non-overlapped manner.

Figure 1B:
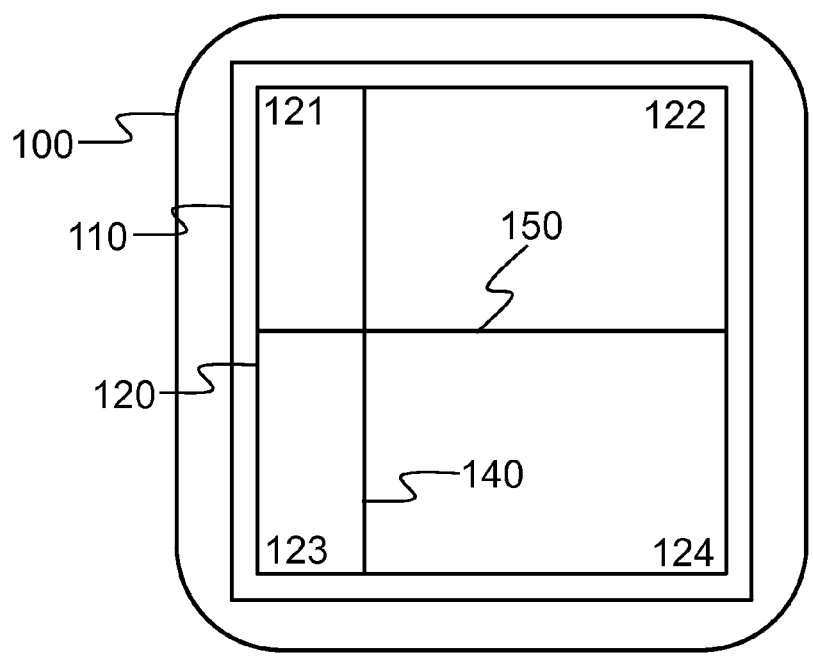
FIG. 1b shows a schematic picture of an operation phase of an apparatus according to an example embodiment of the invention.

FIG. 1b shows a schematic picture of an operation phase of an apparatus 100 according to an example embodiment of the invention. Based on the second touch point 131, sizes of the at least two slave application frames 121-124 are adjusted as described in FIG. 1a, in a non-overlapped manner. After adjusting, the frame line 140 is relocated based on the second touch point 131. Sizes of slave application frames 121, 123 are reduced in horizontal direction in response to the adjusted frame line 140. Another frame line 150 may be maintained in original position without adjustment. Sizes of slave application frames 122, 124 are increased in horizontal direction in response to the adjusted frame line 140. The user may adjust the sizes of the slave application frames dynamically without overlapping in a fast and easy-to-use way.

Figure 2A:
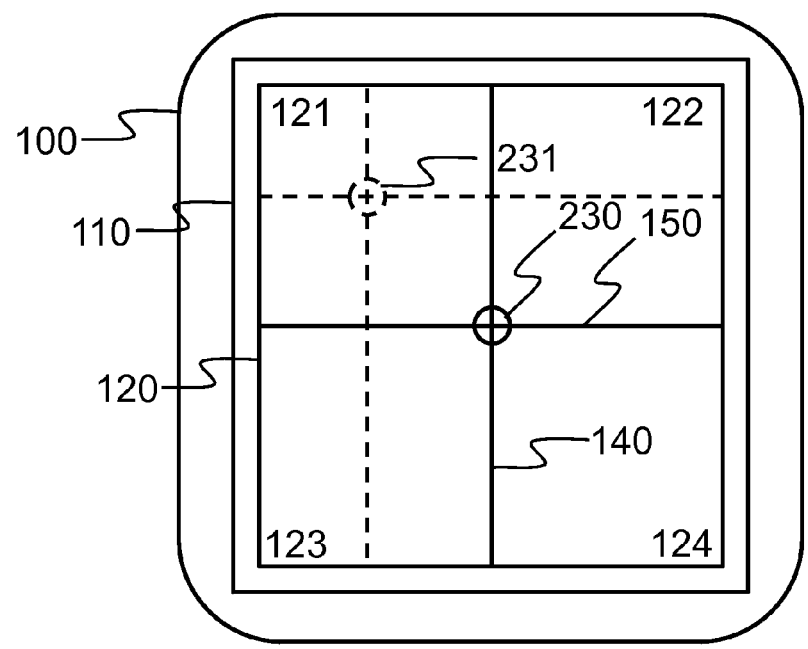
FIG. 2a shows a schematic picture of an apparatus according to an example embodiment of the invention.

FIG. 2a shows a schematic picture of an apparatus 100 according to an example embodiment of the invention. A master application frame 120 is displayed, on the master application viewing area, which frame 120 may comprise a plurality of slave application frames 121-124. In an embodiment, the user may touch the display 110 in a certain location. In FIG. 1a the touched location overlapped a frame line between at least two slave application frames 121-124 causing the adjustment of slave application frame sizes in one dimension. In FIG. 2a, the touch location is represented as a touch point 230. The touch point 230 may be determined using the detector of the apparatus 100. In case the touch point 230 is located over two frame lines 140, 150 between at least two slave application frames 121-124, as shown in FIG. 2a, the at least two slave application frames 121-124 may be determined based on the touch point 230. The user may provide a second touch point 231 on the touch sensitive display 110 in a similar fashion as described for the first touch point 230. The user may release his finger from the touch sensitive display 110 between the first and the second touch points 230-231 or the user may sweep his finger between the points 230-231, for example. Based on the second touch point 231, the frame lines 140, 150 are relocated and sizes of the at least two slave application frames 121-124 may be adjusted, in a non-overlapped manner.

In an embodiment, a master application frame 120 may be a home screen of an apparatus 100. Slave application frames 121-124 may comprise different contents. A first slave application frame 121 may comprise application icons, for example. Such icons may be used by the user to launch the applications. A second slave application frame 122 may comprise widgets, for example. A third slave application frame 123 may comprise content of an open application, for example, such as a browser or an electronic book. A fourth slave application frame 124 may comprise social feed, such as social media application information. Contents of the different slave application frames 121-124 may be dynamically changed by the user for the home screen 120.

Figure 2B:
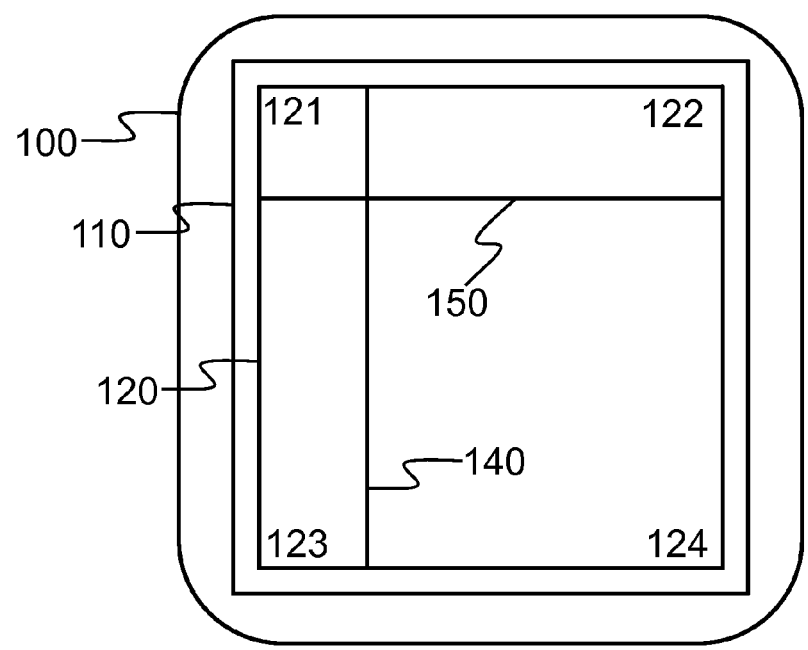
FIG. 2b shows a schematic picture of an operation phase of an apparatus according to an example embodiment of the invention.

FIG. 2b shows a schematic picture of an operation phase of an apparatus 100 according to an example embodiment of the invention. A master application frame 120 is displayed, on the master application viewing area, which frame 120 may comprise a plurality of slave application frames 121-124. Based on the second touch point 231 in FIG. 2a, sizes of the at least two slave application frames 121-124 are adjusted as described in FIG. 2a, in a non-overlapped manner. After the adjustment the frame lines 140, 150 are relocated based on the second touch point 231. Sizes of the slave application frames 121, 123 are reduced both in horizontal and vertical directions in response to the relocated frame lines 140, 150. Sizes of the slave application frames 122, 124 are increased in both horizontal and vertical directions in response to the relocated frame lines 140, 150. The user may adjust the sizes of the slave application frames dynamically without overlapping in a fast and easy-to-use way.

In an embodiment, a border of the at least two slave application frames may be used for adjusting the sizes of the slave application frames. The border may comprise a frame line 140, 150 between at least two slave application frames 121-124.

Figure 3:
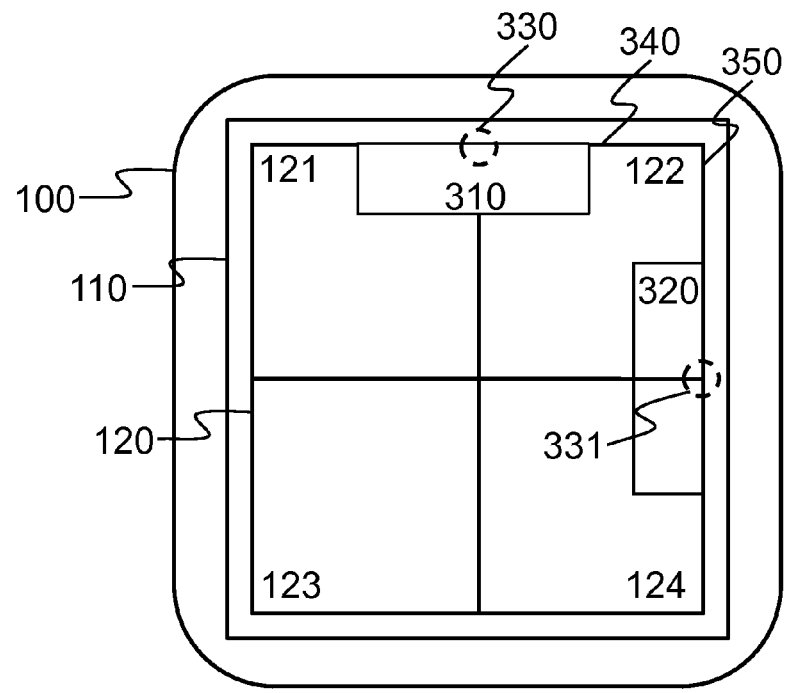
FIG. 3 shows a schematic picture of an apparatus according to an example embodiment of the invention.

FIG. 3 shows a schematic picture of an apparatus 100 according to an example embodiment of the invention. A master application frame 120 is displayed, on the master application viewing area, which frame 120 may comprise a plurality of slave application frames 121-124. In addition to the dynamic and non-overlapping slave application frames 121-124 as described earlier relating to FIGS. 1a-2b, at least one overlapping slave application frame 310, 320 may be provided.

In an embodiment, a border of the at least two slave application frames may be used for adjusting the sizes of the slave application frames. The border may comprise a border line 340, 350 for at least two slave application frames 121-124.

In an embodiment, a touch point 330-331 may be detected on a border line 340, 350 for at least two slave application frames 121-124. Such border line touch point 330-331 may trigger the overlapping slave application frame 310-320. In FIG. 3, the overlapping slave application frame 310 overlaps slave application frames 121-122.

In an embodiment, a first overlapping slave application frame 310 is hidden until the user touches a touch point 330 on a border line 340. In response to touching, the frame 310 is displayed to the user. The frame 310 may be fixed in size configurable via user settings, for example. The frame may be hidden correspondingly, by the user touching the touch point 330 on the border line 340.

In an embodiment, a second overlapping slave application frame 320 is hidden until the user touches a touch point 331 on a border line 350. In response to touching, the frame 320 is displayed to the user. The frame 320 may be fixed in size configurable via user settings, for example. The frame may be hidden correspondingly, by the user touching the touch point 331 on the border line 350.

The first overlapping slave application frame 310 may be configured to be used for real-time information, for example. The second overlapping slave application frame 320 may be configured to be used for settings menu, for example. The touch points 330, 331 may be shown as descriptive icons on the touch sensitive display to guide the user for different actions.

Figure 4:
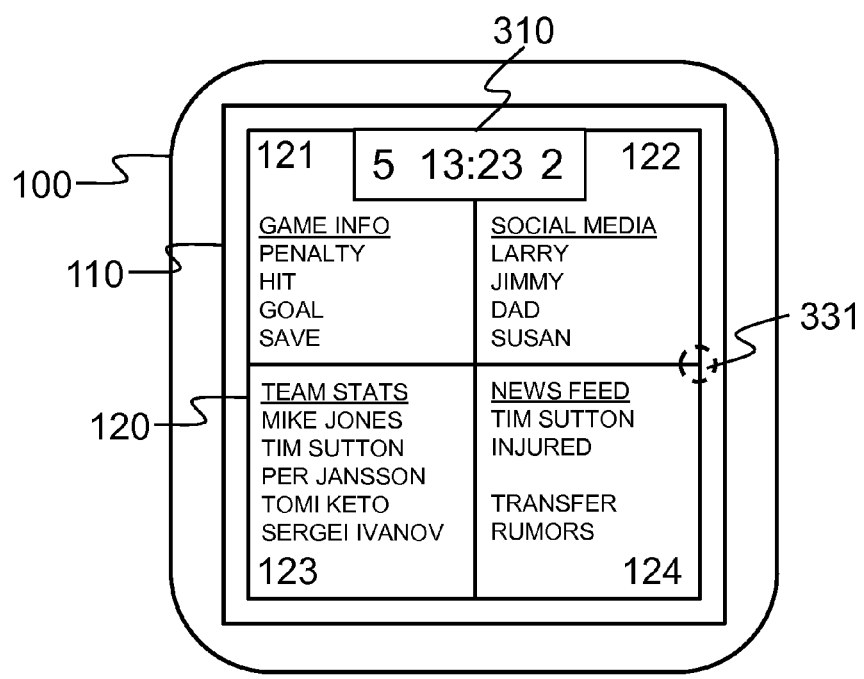
FIG. 4 shows a schematic picture of an apparatus according to an example embodiment of the invention.

FIG. 4 shows a schematic picture of an apparatus 100 according to an example embodiment of the invention. A touch sensitive display 110 displays a master application frame 120. An overlapping slave application frame 310 is active and configured to provide real-time information of an event, for example an ice hockey game. Such information may comprise game time and score, for example. A first non-overlapping slave application frame 121 displays game information, such as game events. A second non-overlapping slave application frame 122 displays social media information, such as online friends and their statuses. A third non-overlapping slave application frame 123 displays player statistics, such as leading goal scorers. A fourth non-overlapping slave application frame 124 displays news feed from various sources, such as newspapers and television channels. A second overlapping slave application frame is not active but may be activated my touching a second touch point 331.

In an embodiment, the second overlapping slave application frame, when activated, may provide a list of possible slave applications that the user may select to the slave application frames. Furthermore, the number of non-overlapping slave application frames is not limited to four (2×2) with rectangular shape but any number and shape may be provided. Such shapes may comprise oval, triangle and polygonal shapes, for example. The shapes may comprise m×n frames or oval-shape configuration with p number of pies configured to frames, for example.

In an embodiment, a touch sensitive display 110 displays a master application frame 120. An overlapping slave application frame 310 may be inactive and invisible when reading the at least one electronic book. Alternatively, the overlapping slave application frame 310 may comprise electronic book related information. At least one non-overlapping slave application frames 121-124 may comprise information relating to a page of an electronic book. A first non-overlapping slave application frame 121 comprises information relating to a first page of a first electronic book. A second non-overlapping slave application frame 122 comprises information relating to a second page of a second electronic book. Furthermore, in an example embodiment, a third non-overlapping slave application frame 123 may comprise information relating to a third page of a third electronic book. A fourth non-overlapping slave application frame 124 may comprise information relating to a fourth page of a fourth electronic book. The first, second, third and fourth books may be same or different books. A second overlapping slave application frame is not active but may be activated my touching a second touch point 331.

Figure 5:
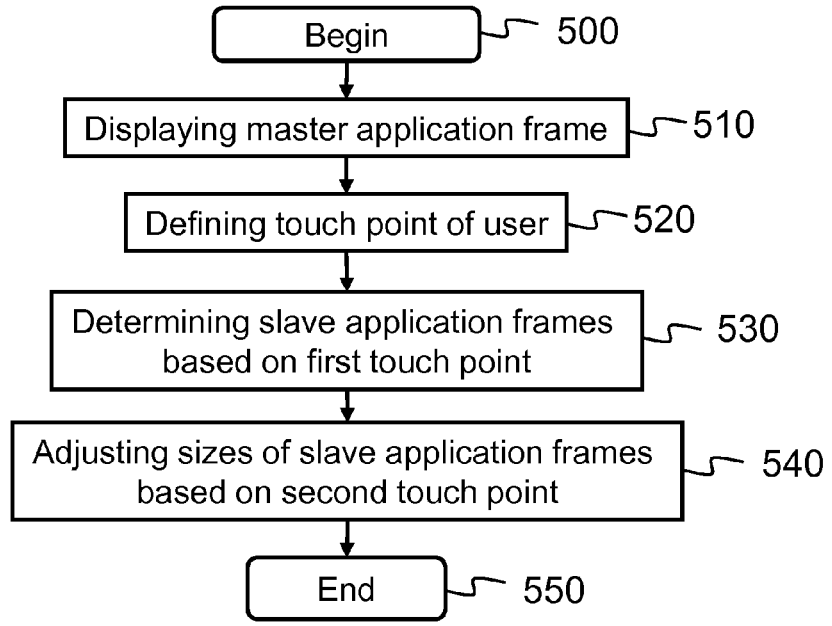
FIG. 5 shows a flow diagram showing operations in an apparatus in accordance with an example embodiment of the invention.

FIG. 5 shows a flow diagram showing operations in an apparatus in accordance with an example embodiment of the invention. In step 500, the method is started. In step 510, a master application frame comprising plurality of slave application frames is displayed on a touch sensitive display. A touch point of a user is defined on the touch sensitive display in step 520. In step 530, at least two slave application frames are determined based on a first touch point. In step 540, sizes of the determined at least two slave application frames are adjusted, in a non-overlapped manner, based on a second touch point. The method ends in step 550.

Figure 6:
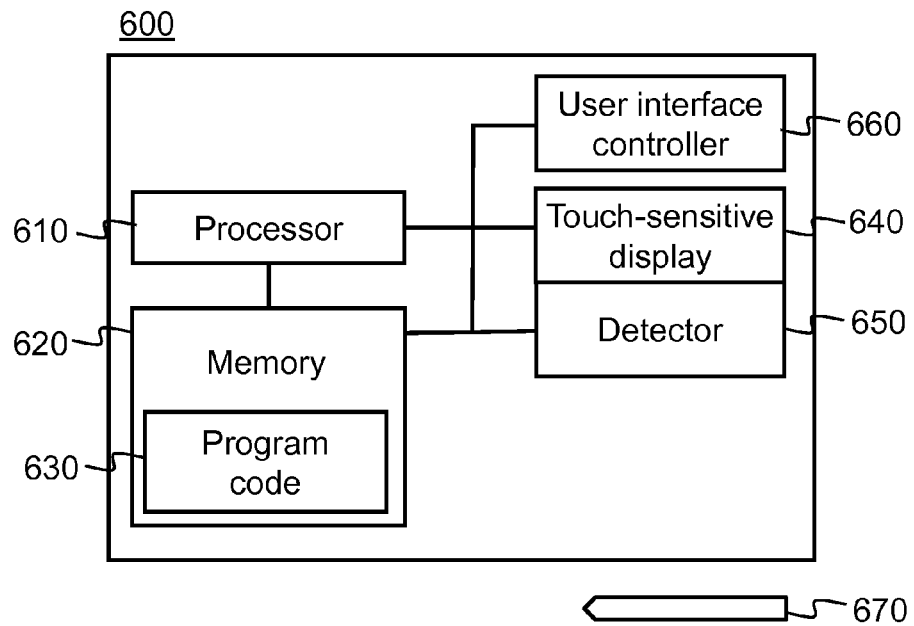
FIG. 6 presents an example block diagram of an apparatus in which various embodiments of the invention may be applied.

FIG. 6 presents an example block diagram of an apparatus 600 in which various embodiments of the invention may be applied. This may be a user equipment (UE), user device or apparatus, such as a mobile terminal, a tablet or other communication device.

The general structure of the apparatus 600 comprises a touch sensitive display 640, a detector for sensing a touch point 650, a processor 610, and a memory 620 coupled to the processor 610. The apparatus 600 further comprises software 630 stored in the memory 620 and operable to be loaded into and executed in the processor 610. The software 630 may comprise one or more software modules and can be in the form of a computer program product. The apparatus 600 may further comprise a user interface controller 690 coupled to the processor 610 and a communication interface module (not shown). Furthermore, an actuator 670, for example a stylus, may be used to operate the apparatus 600 instead of a user's finger.

The processor 610 may be, e.g., a central processing unit (CPU), a microprocessor, a digital signal processor (DSP), a graphics processing unit, or the like. FIG. 6 shows one processor 610, but the apparatus 600 may comprise a plurality of processors.

The memory 620 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 600 may comprise a plurality of memories. The memory 620 may be constructed as a part of the apparatus 600 or it may be inserted into a slot, port, or the like of the apparatus 600 by a user. The memory 620 may serve the sole purpose of storing data, or it may be constructed as a part of an apparatus serving other purposes, such as processing data.

The touch-sensitive display 640 may be for example a liquid crystal display (LCD) or a light-emitting diode (LED) based display. The detector 650 may be integrated to the touch-sensitive display 640 as a touch-sensitive surface of a touch display or a touch screen. The detector 650 may also be included as a separate element, for example as a touchpad.

In an embodiment, a variety of touch-sensitive display technologies may be used for the apparatus 600.

A resistive touchscreen panel may be used, which panel is composed of several layers, the most important of which are two thin, electrically conductive layers separated by a narrow gap. When an object, such as a finger, presses down on a point on the panel's outer surface, the two metallic layers become connected at that point and the panel then behaves as a pair of voltage dividers with connected outputs. Thus, a change is caused in the electrical current, which is registered as a touch event and sent to the controller for processing. The cover sheet consists of a hard outer surface with a coated inner side. Touching the outer layer causes the conductive layers to touch, creating a signal that the analog controller can interpret and determine what the user wants to be done.

Surface acoustic wave (SAW) technology may be used, which technology using ultrasonic waves passing over the touchscreen panel. When the panel is touched, a portion of the wave is absorbed. This change in the ultrasonic waves registers the position of the touch event and sends such information to the controller for processing.

Capacitive touchscreen panel may be used, which panel consists of an insulator such as glass, coated with a transparent conductor such as indium tin oxide (ITO). As the human body is also an electrical conductor, touching the surface of the screen results in a distortion of the screen's electrostatic field, measurable as a change in capacitance. Different technologies may be used to determine the location of the touch. The location is sent to the controller for processing. Unlike a resistive touchscreen, one cannot use a capacitive touchscreen through most types of electrically insulating material, such as gloves but one requires a special capacitive stylus, or a special-application glove with an embroidered patch of conductive thread passing through it and contacting the user's fingertip.

Surface capacitance may be used, in which only one side of the insulator is coated with a conductive layer. A small voltage is applied to the layer, resulting in a uniform electrostatic field. When a conductor, such as a human finger, touches the uncoated surface, a capacitor is dynamically formed. The sensor's controller can determine the location of the touch indirectly from the change in the capacitance as measured from the four corners of the panel.

Projected Capacitive Touch (PCT) technology may be used, in which a capacitive technology permits more accurate and flexible operation, by etching the conductive layer. An X-Y grid is formed either by etching a single layer to form a grid pattern of electrodes, or by etching two separate, perpendicular layers of conductive material with parallel lines or tracks to form the grid (comparable to the pixel grid found in many LCD displays). The greater resolution of PCT allows operation without direct contact, such that the conducting layers can be coated with further protective insulating layers, and operate even under screen protectors, or behind weather- and vandal-proof glass. <Due to the top layer of a PCT being glass, PCT is a more robust solution versus resistive touch technology. Depending on the implementation, an active or passive stylus can be used instead of or in addition to a finger.

This is common with point of sale devices that require signature capture. Gloved fingers may or may not be sensed, depending on the implementation and gain settings.

Mutual capacitance may be used. In mutual capacitive sensors, there is a capacitor at every intersection of each row and each column. A 16-by-14 array, for example, would have 224 independent capacitors. A voltage is applied to the rows or columns. Bringing a finger or conductive stylus close to the surface of the sensor changes the local electrostatic field which reduces the mutual capacitance. The capacitance change at every individual point on the grid can be measured to accurately determine the touch location by measuring the voltage in the other axis. Mutual capacitance allows multi-touch operation where multiple fingers, palms or styli can be accurately tracked at the same time.

Self-capacitance sensors may be used, having the same X-Y grid as mutual capacitance sensors, but the columns and rows operate independently. With self-capacitance, the capacitive load of a finger is measured on each column or row electrode by a current meter.

The user interface controller 660 may comprise circuitry for receiving input from a user of the apparatus 600, e.g., via a keyboard, graphical user interface shown on the display 640 of the apparatus 600, speech recognition circuitry, or an accessory device, such as a headset, and for providing output to the user via, e.g., a graphical user interface or a loudspeaker.

A skilled person appreciates that in addition to the elements shown in FIG. 6, the apparatus 600 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 600 may comprise a disposable or rechargeable battery (not shown) for powering the apparatus 600 when external power if external power supply is not available.

Figure 7:
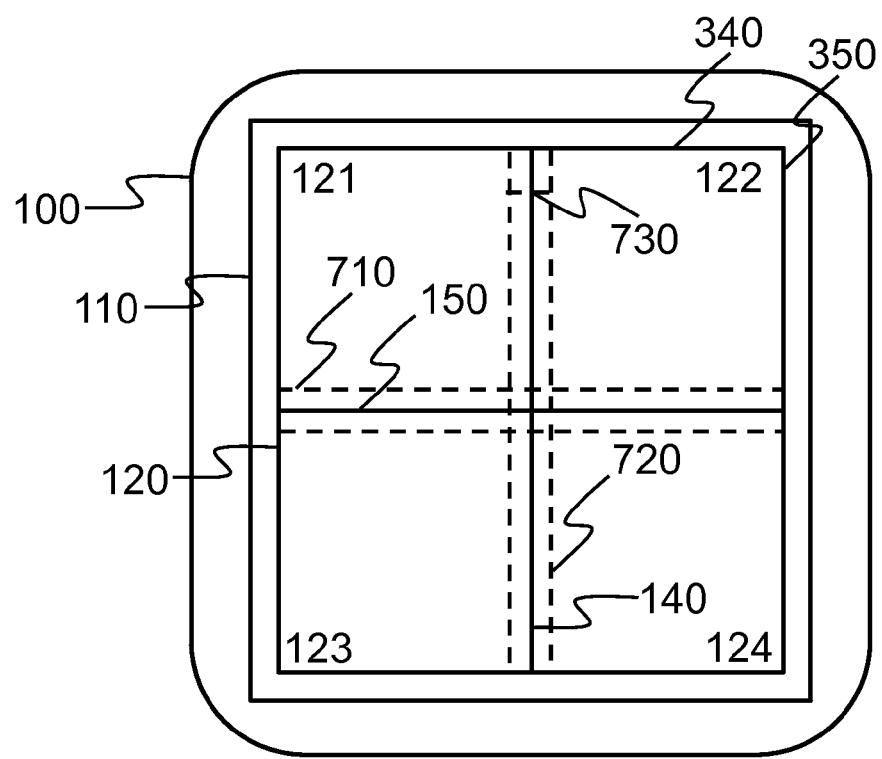
FIG. 7 shows a schematic picture of an apparatus according to an example embodiment of the invention.

FIG. 7 shows a schematic picture of an apparatus 100 according to an example embodiment of the invention. A user may touch the display 110 in a certain location. Such location is represented as a touch point. The touch point may be determined using the detector of the apparatus 100. In case the touch point is located over a frame line 140, 150 between at least two slave application frames 121-124, as shown in FIG. 7, the at least two slave application frames 121-124 may be determined based on the touch point. The user may provide a second touch point on the touch sensitive display 120 in a similar fashion as described for the first touch point. In FIG. 7, the touch-sensitive display 110 comprises a master application frame 120. The master application frame 120 comprises a plurality (in this embodiment four) of slave application frames 121-124. A plurality of touch point areas 710, 720 may be defined in the vicinity of frame lines 140, 150. Intention of the areas 710, 720 is to define the potential area for touch points used for adjusting sizes of at least two non-overlapping slave application frames 121-124, as described earlier in this application. Width of the areas 710, 720 may be adjusted based on user settings of the apparatus 100, for example.

In an embodiment, at least one touch point area 730 may be defined in the vicinity of border lines 340, 350. The area 730 may be defined to comprise a predefined part of the border line end of the areas 710, 720. Furthermore, the area 730 may be defined to comprise an area in the vicinity of the whole border line 340, 350, correspondingly to the areas 710, 720.

In an embodiment, a border of the at least two slave application frames may be used for adjusting the sizes of the slave application frames. The border may comprise a border line 340, 350 for at least two slave application frames 121-124. Such border line touch point areas may trigger the overlapping slave application frame as described earlier in this application. Width and position of the area 730 may be adjusted based on user settings of the apparatus 100, for example.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
a touch sensitive display for displaying a master application frame, wherein the master application frame provides information relating to a sports event;
a detector configured to detect a touch point of a user on the touch sensitive display;
at least one processor; and
at least one memory including computer program code, the at least one memory and the computer program code being configured to, with the at least one processor, cause the apparatus at least to:
display the master application frame comprising a plurality of slave application frames;
provide real-time information of the sports event in a first slave application frame;
provide non-real-time information of the sports event in a second slave application frame;
determine M×N non-overlapping slave application frames based on a first touch point, wherein the M×N non-overlapping slave application frames comprise the second slave application frame, and wherein the M x N non-overlapping slave application frames display information relating to statistics of the sport event and at least one of social media information relating to the sports event, and news feed information relating to the sports event;
define a sweep function configured to detect, using the detector, a sweep gesture on the touch sensitive display between the first touch point and a second touch point;
adjust sizes of the M×N non-overlapping slave application frames based on the detected sweep gesture;
define a touch point area in an intersection of a border line of at least two of the non-overlapping slave application frames and a border line of the master application frame;

detect a third touch point on the defined touch point area; and trigger an overlapping slave application frame in response to the detected third touch point, wherein the overlapping slave application frame partially overlaps the at least two non-overlapping slave application frames, and wherein the overlapping slave application frame comprises the first slave application frame.

2. The apparatus of claim 1, the at least one memory and the computer program code being further configured to, with the at least one processor, cause the apparatus at least to:
detect the first touch point at a border of the at least two slave application frames; and
adjust sizes of the determined at least two slave application frames by moving the border of the at least two slave application frames to the second touch point.

3. The apparatus of claim 2, wherein the border of the at least two slave application frames comprises at least one of the following:
a frame line between at least two slave application frames; and
a border line for at least two slave application frames.

4. The apparatus of claim 1, the at least one memory and the computer program code being further configured to, with the at least one processor, cause the apparatus at least to:
display the master application frame comprising four slave application frames, wherein the four slave application frames sharing a common frame point;
determine the four slave application frames based on a first touch point, wherein the first touch point corresponds to the common frame point; and
adjust sizes of the determined four slave application frames, in a non-overlapped manner, based on a second touch point.

5. The apparatus of claim 4, wherein each slave application frame presenting information provided by a different slave application, selectable by the user.

6. The apparatus of claim 1, wherein at least one slave application frame comprises information relating to an electronic book, wherein a first slave application frame comprises information relating to a first page of a first electronic book and a second slave application frame comprises information relating to a second page of a second electronic book.

7. The apparatus of claim 1, wherein the slave application frame presenting information provided by a slave application, the slave application providing at least one of the following:
a score service;
a video application;
an internet radio;
a ticket store;
a fan shop;
player cards;
statistics;
fixtures;
sponsor information; and
a social media application.

8. The apparatus of claim 1, the at least one memory and the computer program code being further configured to, with the at least one processor, cause the apparatus at least to:
determine at least one fixed slave application frame overlapping at least one other slave application frame.

9. The apparatus of claim 1, the at least one memory and the computer program code being further configured to, with the at least one processor, cause the apparatus at least to:
define a control item touch point in the master application frame overlapping the at least two slave application frames; and provide settings menu for selecting slave applications for the slave application frames in response to the user touching the control item touch point.

10. The apparatus of claim 1, the at least one memory and the computer program code being further configured to, with the at least one processor, cause the apparatus at least to:
provide settings menu information in a third slave application frame; and
detect a fourth touch point on a border line for at least two slave application frames;
trigger a second overlapping slave application frame in response to the detected fourth touch point, wherein the second overlapping slave application frame comprises the third slave application frame.

11. The apparatus of claim 10, wherein the third touch point and the fourth touch point are located on different border lines of at least two slave application frames.

12. The apparatus of claim 1, wherein the overlapping slave application frame partially overlaps the at least two non-overlapping slave application frames so that information provided by the at least two non-overlapping slave application frames is partially available for the user when the overlapping slave application frame being triggered.

13. The apparatus of claim 1, wherein the M×N non-overlapping slave application frames presenting information provided by a slave application, the slave application providing: statistics of the sport event, social media information relating to the sports event, a video application, and sponsor information relating to the sports event.

14. The apparatus of claim 4, wherein the non-overlapping slave application frames each presenting information provided by a slave application, the slave application providing: statistics of the sport event, social media information relating to the sports event, a video application, and sponsor information relating to the sports event.

15. The apparatus of claim 1, the at least one memory and the computer program code being further configured to, with the at least one processor, cause the apparatus at least to:
define a second touch point area in an intersection of a second border line of at least two of the non-overlapping slave application frames and a second border line of the master application frame;
detect a fourth touch point on the defined second touch point area;
trigger a second overlapping slave application frame in response to the detected fourth touch point, wherein the second overlapping slave application frame partially overlaps the at least two non-overlapping slave application frames.

16. The apparatus of claim 15, wherein the first and the second overlapping slave application frames are hidden until the user touches the third touch point or the fourth touch point respectively, and in response to touching, the first overlapping slave application frame or the second overlapping slave application frame is displayed to the user, wherein the first and the second overlapping slave application frames are hidden again by the user touching the corresponding touch point again.

17. The apparatus of claim 16, wherein the first overlapping slave application frame is fixed in size configurable via user settings.

18. The apparatus of claim 16, wherein the first overlapping slave application frame is configured to be used for real-time information, the second overlapping slave application frame is configured to be used for settings menu, and the third and fourth touch points are shown as descriptive icons on the touch sensitive display to guide the user for different actions.

19. A method comprising:
- displaying a master application frame comprising a plurality of slave application frames, on a touch sensitive display, wherein the master application frame provides information relating to a sports event;
- detecting a touch point of a user on the touch sensitive display using a detector;
- providing real-time information of the sports event in a first slave application frame;
- providing non-real-time information of the sports event in a second slave application frame;
- determining M×N non-overlapping slave application frames based on a first touch point, wherein the M×N non-overlapping slave application frames comprise the second slave application frame, and wherein the M×N non-overlapping slave application frames display information relating to statistics of the sport event and at least one of social media information relating to the sports event, and news feed information relating to the sports event;
- defining a sweep function configured to detect, using the detector, a sweep gesture on the touch sensitive display between the first and a second touch point;
- adjusting sizes of the M×N non-overlapping slave application frames based on the detected sweep gesture;
- defining a touch point area in an intersection of a border line of at least two of the non-overlapping slave application frames and a border line of the master application frame;
- detecting a third touch point on the defined touch point area; and
- triggering an overlapping slave application frame in response to the detected third touch point, wherein the overlapping slave application frame partially overlaps the at least two non-overlapping slave application frames, and wherein the overlapping slave application frame comprises the first slave application frame.

20. A computer program embodied on a computer readable non-transitory medium comprising computer executable program code which, when executed by at least one processor of an apparatus, causes the apparatus to:
- display a master application frame comprising a plurality of slave application frames, on a touch sensitive display, wherein the master application frame provides information relating to a sports event;
- detect a touch point of a user on the touch sensitive display using a detector;
- provide real-time information of the sports event in a first slave application frame;
- provide non-real-time information of the sports event in a second slave application frame;
- determine M×N non-overlapping slave application frames based on a first touch point, wherein the M×N non-overlapping slave application frames comprise the second slave application frame, and wherein the M×N non-overlapping slave application frames display information relating to statistics of the sport event and at least one of social media information relating to the sports event, and news feed information relating to the sports event;
- define a sweep function configured to detect, using the detector, a sweep gesture on the touch sensitive display between the first and a second touch point;
- adjust sizes of the M×N non-overlapping slave application frames based on the detected sweep gesture;
- define a touch point area in an intersection of a border line of at least two of the non-overlapping slave application frames and a border line of the master application frame;
- detect a third touch point on the defined touch point area; and
- trigger an overlapping slave application frame in response to the detected third touch point, wherein the overlapping slave application frame partially overlaps the at least two non-overlapping slave application frames, and wherein the overlapping slave application frame comprises the first slave application frame.

* * * * *